United States Patent
Nakao et al.

(10) Patent No.: US 12,266,945 B2
(45) Date of Patent: Apr. 1, 2025

(54) CONTACTLESS POWER FEED APPARATUS

(71) Applicant: OMRON Corporation, Kyoto (JP)

(72) Inventors: Goro Nakao, Kyoto (JP); Yuki Ito, Kyoto (JP); Taichi Mishima, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/461,536

(22) Filed: Sep. 6, 2023

(65) Prior Publication Data

US 2024/0136859 A1    Apr. 25, 2024
US 2024/0235266 A9    Jul. 11, 2024

(30) Foreign Application Priority Data

Oct. 19, 2022  (JP) .................................. 2022-167860

(51) Int. Cl.
*H02J 50/12*  (2016.01)
*H02J 50/50*  (2016.01)

(52) U.S. Cl.
CPC .............. *H02J 50/12* (2016.02); *H02J 50/50* (2016.02)

(58) Field of Classification Search
CPC .................................. H02J 50/50; H02J 50/12
See application file for complete search history.

(56) References Cited

U.S. PATENT DOCUMENTS

| | | | |
|---|---|---|---|
| 2015/0214747 A1* | 7/2015 | Abe | H01F 38/14 307/104 |
| 2019/0006887 A1 | 1/2019 | Hosotani | |
| 2022/0115916 A1* | 4/2022 | Jia | H04B 5/79 |
| 2022/0302766 A1 | 9/2022 | Nakayashiki et al. | |

FOREIGN PATENT DOCUMENTS

| | | |
|---|---|---|
| CN | 110350636 | 10/2019 |
| TW | 201834356 X | 9/2018 |
| TW | 202032886 | 9/2020 |

OTHER PUBLICATIONS

Fumio Ichihara et al., "GaN FET Class E HF band Transmitter for Wireless Energy Transfer," Power Technology/Power System Technology/Semiconductor Power Conversion Joint Study Group, Nov. 2016, available at: http://hdl.handle.net/10228/00006159.

(Continued)

*Primary Examiner* — Ryan Johnson
(74) *Attorney, Agent, or Firm* — JCIPRNET

(57) ABSTRACT

A contactless power feed apparatus 1 has a relay circuit 4 relaying power transmitted from a power transmission device 2 to a power reception device 3 in a contactless manner. The power transmission device 2 has: a transmission coil 12 transmitting AC power to the relay circuit 4. The relay circuit 4 has: a first coil 31, electromagnetically coupled with the transmission coil 12 and receiving the AC power from the transmission coil 12; a second coil 32, transmitting the AC power to the power reception device 3; and a resonant capacitor 33, resonating with the AC power supplied to the transmission coil 12 together with the first and second coils 31, 32. The power reception device 3 has: a resonant circuit 20, having a reception coil 21 receiving AC power from the second coil 32 by being electromagnetically coupled with the second coil 32 of the relay circuit 4.

4 Claims, 5 Drawing Sheets

(56) References Cited

OTHER PUBLICATIONS

Lujie Zhang, "Load-Indepedent Class-E Power Conversion," Doctoral Dissertation, Feb. 2020, Department of Electrical Engineering, Virginia Polytechnic Institute and State University, available at: https://vtechworks.lib.vt.edu/handle/10919/97601.

"Office Action of Taiwan Counterpart Application", issued on Jul. 8, 2024, with English translation thereof, p. 1-p. 9.

* cited by examiner

CONTACTLESS POWER FEED APPARATUS

CROSS-REFERENCE TO RELATED APPLICATION

This application claims the priority benefit of Japan application serial No. 2022-167860, filed on Oct. 19, 2022. The entirety of the above-mentioned patent application is hereby incorporated by reference herein and made a part of this specification.

BACKGROUND

Technical Field

The invention relates to a contactless power feed apparatus.

Description of Related Art

Conventionally, the so-called non-contact power feed (also referred to as wireless power feed) technologies for transmitting power through space without via a metal contact, etc., have been under research.

As one of the contactless power feed technologies, power feed through electromagnetic induction is known. In the power feed through electromagnetic induction, in general, by driving an inverter provided at a device on the power transmission side at a switching frequency lower than 1 MHz, AC power is supplied to a coil on the power transmission side to generate electromagnetic induction with a coil on the power reception side. Comparatively, a technology has been proposed to enable switching at a frequency of 6.78 MHz by configuring a power transmitter for power supply as a Class-E amplifier (see Non-Patent Document 1, for example).

PRIOR ART DOCUMENT(S)

Non-Patent Document(s)

[Non-Patent Document 1] Fumio Ichihara, Ichiro Omura, "GaN FET Class E HF band Transmitter for Wireless Energy Transfer", Power Technology/Power System Technology/Semiconductor Power Conversion Joint Study Group 2016, EDD-16-069/SPC-16-156, 2016

In the device on the power transmission side of the contactless power feed apparatus, in order to configure a power supply circuit supplying power to the coil on the power transmission side as a Class-E amplifier, it is required that the conditions as follows be satisfied for the switching element provided in the power supply circuit.

- The voltage applied to the switching element at the timing of switching from ON to OFF or from OFF to ON is zero (Zero-Voltage-Switching, referred to as ZVS in the following); and
- The slope of the voltage applied to the switching element with respect to time change at the timing when the switching element is switched from OFF to ON is zero (i.e., dV/dt=0) (Zero-Voltage-Derivative-Switching, referred to as ZDS in the following).

By satisfying the conditions of ZVS and ZDS, the switching loss in the switching element is reduced as much as possible. As a result, the power transmission efficiency is facilitated. However, as the load connected with the device on the power reception side changes, the conditions for achieving ZVS and ZDS changes.

The invention provides a contactless power feed apparatus capable of suppressing the deterioration of the power transmission efficiency even in the case where the load connected with the device on the power reception side changes.

SUMMARY

As an aspect of the invention, a contactless power feed apparatus is provided. The contactless power feed apparatus includes a power transmission device, a power reception device, and a relay circuit relaying power transmitted from the power transmission device to the power reception device in a contactless manner. The power transmission device has: a transmission coil, transmitting AC power that is supplied to the relay circuit; and a power supply circuit, converting DC power supplied from a DC power source into AC power having a predetermined frequency and supplying the AC power that is converted to the transmission coil. The relay circuit has: a first coil, disposed to be electromagnetically coupled with the transmission coil and receiving the AC power from the transmission coil; a second coil, transmitting the AC power that is received via the first coil to the power reception device; and a resonant capacitor, resonating with the AC power supplied to the transmission coil together with the first coil and the second coil. In addition, the power reception device has: a resonant circuit, having a reception coil receiving the AC power from the second coil by being electromagnetically coupled with the second coil of the relay circuit; and a rectifying and smoothing circuit, rectifying and converting the AC power output from the resonant circuit into DC power, and outputting the DC power to a load circuit.

DESCRIPTION OF THE EMBODIMENTS

Figure 1:
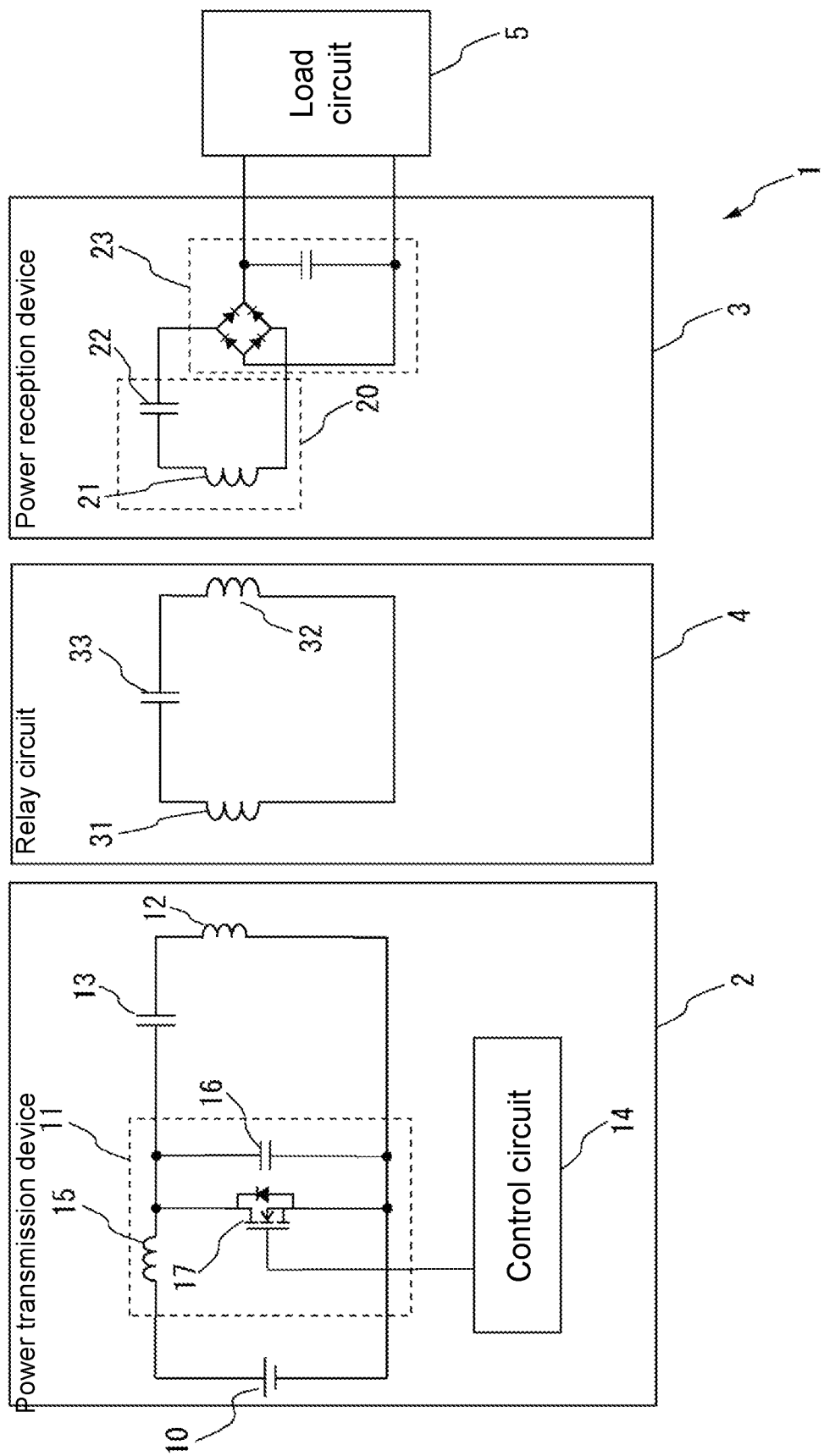
FIG. 1 is a schematic diagram illustrating a configuration of a contactless power feed apparatus according to an embodiment of the invention.

As an aspect of the invention, a contactless power feed apparatus is provided. The contactless power feed apparatus includes a power transmission device, a power reception device, and a relay circuit relaying power transmitted from the power transmission device to the power reception device in a contactless manner. The power transmission device has: a transmission coil, transmitting AC power that is supplied to the relay circuit; and a power supply circuit, converting DC power supplied from a DC power source into AC power having a predetermined frequency and supplying the AC power that is converted to the transmission coil. The relay circuit has: a first coil, disposed to be electromagnetically coupled with the transmission coil and receiving the AC power from the transmission coil; a second coil, transmitting the AC power that is received via the first coil to the power reception device; and a resonant capacitor, resonating with the AC power supplied to the transmission coil together with the first coil and the second coil. In addition, the power reception device has: a resonant circuit, having a reception coil receiving the AC power from the second coil by being electromagnetically coupled with the second coil of the relay circuit; and a rectifying and smoothing circuit, rectifying and converting the AC power output from the resonant circuit into DC power, and outputting the DC power to a load circuit.

According to such configuration, the contactless power feed apparatus can suppress the deterioration of the power transmission efficiency even in the case where the load connected with the device on the power reception side changes.

In the contactless power feed apparatus, it may be that the second coil of the relay circuit is disposed so that the first coil of the relay circuit and the transmission coil of the power transmission device are not electromagnetically coupled. According to such configuration, the contactless power feed apparatus can reliably suppress the deterioration of the power transmission efficiency with respect to the change of the load connected with the device on the power reception side.

In the contactless power feed apparatus, it may be that an outer periphery of the second coil of the relay circuit is greater than an outer periphery of the first coil of the relay circuit. With such configuration, in the contactless power feed apparatus, the reception coil of the power reception device is electromagnetically coupled with respect to the second coil of the relay circuit, while the arrangement so that the transmission coil and the first coil are not electromagnetically coupled can be simplified.

In the contactless power feed apparatus, it may be that the first coil of the relay circuit is formed on a surface of a substrate and the transmission coil of the power transmission device is formed on an other surface of the substrate so that a central axis of the first coil and a central axis of the transmission coil are coaxial.

With such configuration, the contactless power feed apparatus can increase the coupling degree between the transmission coil and the first coil, thereby suppressing the deterioration of the power transmission efficiency.

Alternatively, it may also be that the first coil of the relay circuit and the transmission coil of the power transmission device are wound on a same core. With such configuration, the contactless power feed apparatus can increase the coupling degree between the transmission coil and the first coil, thereby suppressing the deterioration of the power transmission efficiency.

In the following, a contactless power feed apparatus according to an embodiment of the invention and a power transmission method executed by the contactless power feed apparatus are described with reference to the drawings. The contactless power feed apparatus drives a switching element of a power supply circuit supplying AC power to a coil on a power transmission side by using a switching frequency included in an ISM band with few usage limitations. In addition, the inventors have found that, regarding the switching element of the power supply circuit, even if ZDS is not achieved, if ZVS is achieved, and the difference between the timing at which the switching element is changed from OFF to ON and the timing of becoming the voltage applied to the switching element is sufficiently small, even if the switching element is driven by using a switching frequency included in the ISM band, the switching loss of the switching element can be reduced to an extent that has no problem in practical use.

Therefore, the contactless power feed apparatus has a relay circuit for relaying the AC power transmitted from the device on the power transmission side to the device on the power reception side between the device on the power transmission side and the device on the power reception side. The relay circuit has a first coil electromagnetically coupled with a power transmission coil provided at the device on the power transmission side, a second coil electromagnetically coupled with a power reception coil provided at the device on the power reception side, and a resonant capacitor for resonating with respect to the AC power transmitted from the device on the power transmission side together with the first coil and the second coil. Accordingly, even if the load connected with the device on the power reception side changes, it is possible for the contactless power feed apparatus to achieve ZVS and make the difference between the timing at which the switching element changes from OFF to ON and the timing of becoming the voltage applied to the switching element sufficiently small. As a result, it is possible for the contactless power supply apparatus to alleviate the switching loss in the switching element to suppress the deterioration of the power transmission efficiency.

FIG. 1 is a schematic diagram illustrating a configuration of a contactless power feed apparatus according to an embodiment of the invention. As shown in FIG. 1, the contactless power feed apparatus 1 has a power transmission device 2, a power reception device 3 to which power is transmitted contactlessly via space from the power transmission device 2, and a relay circuit 4 relaying AC power transmitted from the power transmission device 2 to the power reception device 3. The power transmission device 2 has a power supply circuit 11, a transmission coil 12, a capacitor 13, and a control circuit 14. Meanwhile, the power reception device 3 has a resonant circuit 20 including a reception coil 21 and a resonant capacitor 22, and a rectifying and smoothing circuit 23. In addition, the power reception device 3 is connected with the load circuit 5. The load circuit 5 is, for example, a secondary battery, a charging circuit of a secondary battery, or a circuit operating by using DC power. In addition, the relay circuit 4 has a first coil 31, a second coil 32, and a resonant capacitor 33.

Firstly, the power transmission device 2 is described.

The power supply circuit 11 converts the DC power supplied from a DC power source 10 into AC power having a frequency included in the ISM band, and supplies the converted AC power to the transmission coil 12. Therefore, the power supply circuit 11 has a coil 15, a capacitor 16, and a switching element 17 and is configured as a DC-AC capacitor.

The coil 15 is connected between a terminal on the positive electrode side of the DC power source 10 and an end of the transmission coil 12. In addition, an end of the capacitor 16 is connected between the coil 15 and an end of the transmission coil 12, and the other end of the capacitor 16 is connected with a terminal on the negative electrode side of the DC power source 10. In addition, the coil 15 and the capacitor 16 convert the DC power output from the DC power source 10 into the AC power having a switching frequency at which the switching element 17 is switched ON and OFF.

The switching element 17 is connected between the capacitor 16 and the coil 15 so as to be parallel with the capacitor 16. That is, an end of the switching element 17 is connected with the terminal on the positive electrode side of the DC power source 10 via the coil 15, and the other end of the switching element 17 is connected with the terminal on the negative electrode side of the DC power source 10.

In addition, the switching element 17 is an element able to switch ON and OFF by using a switching frequency included in the ISM band. For example, the switching element 17 can be a field effect transistor formed of gallium nitride (GaN FET). The switching terminal (e.g., the gate terminal of the GaN FET) of the switching element 17 is connected with the control circuit 14, and is switched ON and OFF in accordance with a control signal from the control circuit 14. As described above, with the switching element 17 being switched ON and OFF by using the switching frequency, the DC power output from the DC power source 10 is converted into the AC power having the switching frequency by the coil 15 and the capacitor 16. The converted AC power is then output to the transmission coil 12.

The power supply circuit 11 is provided with a DC-DC converter for stepping up or down the DC power output from the DC power source 10 between the DC power source 10 and the coil 15.

The transmission coil 12 generates a magnetic field that changes periodically around the transmission coil 12 in accordance with the AC power supplied from the power supply circuit 11. With the magnetic field generated by the transmission coil 12, the transmission coil 12 and the first coil 31 of the relay circuit 4 are electromagnetically coupled. Accordingly, the AC power supplied to the transmission coil 12 is transmitted to the relay circuit 4.

The capacitor 13 is connected in series with the transmission coil 12 between an output terminal on the positive electrode side of the power supply circuit 11 and an end of the transmission coil 12. In addition, the AC power output from the power supply circuit 11 is supplied to the transmission coil 12 via the capacitor 13.

The control circuit 14 has a processor, a memory, and a gate driver. In addition, the control circuit 14 switches ON and OFF of the switching element 17 of the power supply circuit 11 via the gate driver by using the switching frequency (e.g., 6.78 MHz or 13.56 MHz) included in the ISM band and the predetermined duty ratio (e.g., 0.5).

Then, the power reception device 3 is described.

The resonant circuit 20 is an LC resonant circuit in which the reception coil 21 and the resonant capacitor 22 are connected in series. In addition, an end of the reception coil 21 provided in the resonant circuit 20 is connected with an input terminal of the rectifying and smoothing circuit 23 via the resonant capacitor 22. In addition, the other end of the reception coil 21 is connected with the other input end of the rectifying and smoothing circuit 23. However, the resonant circuit 20 is not limited to the example, and may also be an LC parallel resonant circuit in which the reception coil 21 and the resonant capacitor 22 are connected in parallel.

By resonating with respect to the AC current flowing in the second coil 32 of the relay circuit 4 together with the resonant capacitor 22, the reception coil 21 receives power from the power transmission device 2 via the relay circuit 4. In addition, the reception coil 21 outputs the received power to the rectifying and smoothing circuit 23 via the resonant capacitor 22. That is, the inductance of the reception coil 21 and the capacitance of the resonant capacitor 22 are set so that the resonant frequency of the resonant circuit 20 is substantially equal to the switching frequency.

The resonant capacitor 22 is connected in series with the reception coil 21. That is, an end of the resonant capacitor 22 is connected with an end of the reception coil 21, and the other end of the resonant capacitor 22 is connected with the rectifying and smoothing circuit 23. In addition, the resonant capacitor 22 outputs the AC power received by resonating with the reception coil 21 to the rectifying and smoothing circuit 23.

The rectifying and smoothing circuit 23, for example, is formed by a full-wave rectifying circuit having four bridge-connected diodes and a smoothing capacitor. One of the two terminals on the input side of the full-wave rectifying circuit is connected with the resonant capacitor 22, and the other of the two terminals on the input side are connected with the reception coil 21. In addition, one of the two terminals on the output side of the full-wave rectifying circuit is connected with an end of the smoothing capacitor, and the other of the two terminals on the output side is connected with the other end of the smoothing capacitor. In addition, the rectifying and smoothing circuit 23 rectifies and converts the AC power output from the resonant circuit 20 into DC power. The rectifying and smoothing circuit 23 outputs the converted DC power to the load circuit 5. It is noted that, in place of a full-wave rectifying circuit, the rectifying circuit 23 may also include a half-wave rectifying circuit.

In addition, the power reception device 3 may further include a DC-DC converter for stepping up or down the voltage of the DC power output from the rectifying and smoothing circuit 23.

Then, the relay circuit 4 is described.

The first coil 31 forms an LC serial resonant circuit together with the second coil 32 and the resonant capacitor 33. The first coil 31 is disposed at a position able to be electromagnetically coupled with the transmission coil 12, and receives the power from the power transmission device 2 by resonating with respect to the AC current flowing in the transmission coil 12 of the power transmission device 2 together with the second coil 32 and the resonant capacitor 33.

The second coil 32 generates a magnetic field by using the AC power received from the power transmission device 2 via the first coil 31. Therefore, by disposing the reception coil 21 of the power reception device 3 at a position able to be electromagnetically coupled with the second coil 32, the AC power received by the relay circuit 4 from the power transmission device 2 is transmitted to the power reception device 3.

The resonant capacitor 33 is connected in series with the first coil 31 and the second coil 32. That is, an end of the resonant capacitor 33 is connected with an end of the first coil 31, and the other end of the resonant capacitor 33 is connected with an end of the second coil 32. In addition, by resonating with respect to the current flowing in the transmission coil 12 of the power transmission device 2 together with the first coil 31 and the second coil 32, the resonant capacitor 33 receives the AC power from the power transmission device 2. That is, the inductance of the first coil 31 and the second coil 32 and the capacitance of the resonant capacitor 33 are set so that the resonant frequency of the relay circuit 4 is substantially equal to the switching frequency.

It is noted that the inductance of the first coil 31 and the inductance of the second coil 32 may be equal to or different from each other. In addition, the detailed arrangements of the respective coils of the relay circuit 4 and the transmission coil 12 will be described afterwards.

In the following, the operation of the contactless power feed apparatus 1 is described in detail.

Figure 2:
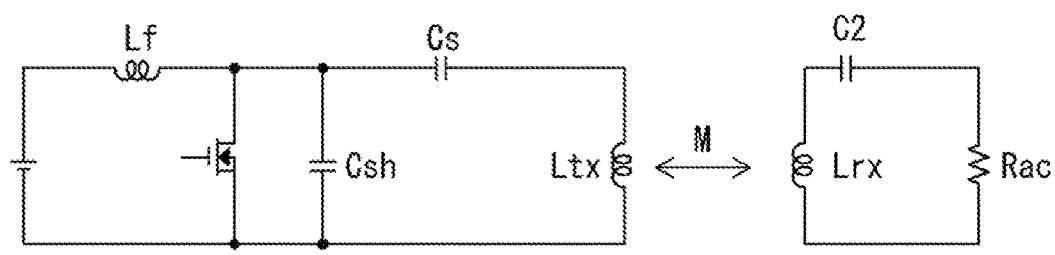
FIG. 2 is an equivalent circuit diagram of a contactless power feed apparatus of a comparative example without a relay circuit.
Figure 2:
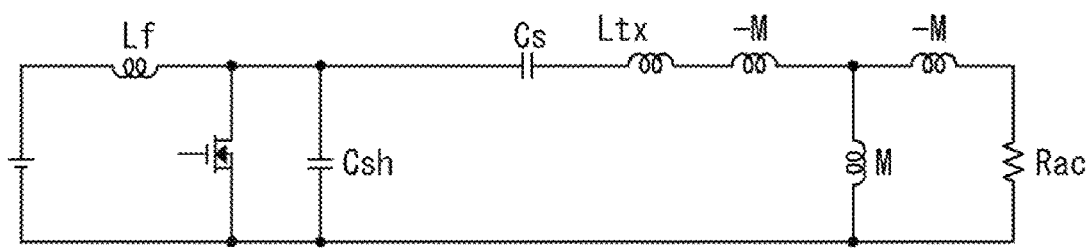
Figure 2:
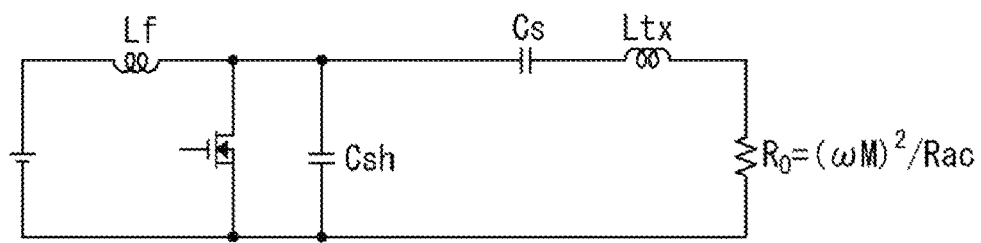

FIG. 2 is an equivalent circuit diagram of a contactless power feed apparatus of a comparative example without the relay circuit 4. That is, an equivalent circuit 200 shown in FIG. 2 is an equivalent circuit diagram of a comparative example in which, in the contactless power feed apparatus 1, the relay circuit 4 is omitted, and AC power is directly transmitted from the power transmission device 2 to the power reception device 3 through electromagnetically coupling the transmission coil 12 of the power transmission device 2 and the reception coil 21 of the power reception device 3. Here, Lf, Ltx, and Lrx are respectively the inductances of the coil 15 of the power supply circuit 11, the transmission coil 12, and the reception coil 21, and Csh, Cs, and C2 are respectively the capacitances of the capacitor 16 of the power supply circuit 11, the capacitor 13, and the resonant capacitor 22. In addition, Rac is a load resistance of the power reception device 3. In addition, M is the mutual inductance between the transmission coil 12 and the reception coil 21.

In the case where the resonant circuit 20 of the power reception device 3 is resonating, the equivalent circuit 200 can be rewritten as an equivalent circuit 210 or an equivalent circuit 220. At this time, an impedance Z of the entire contactless power feed apparatus of the comparative example, that is, the impedance observed from the side of the power transmission device 2 during power transmission is represented as follows:

[Equation 1]

$$1/Z = 1/j\omega M + 1/(Rac - j\omega M) \quad (1)$$
$$= Rac/(\omega^2 M^2 + j\omega MRac)$$
$$Z = Ro + j\omega M$$
$$Ro = \frac{(\omega \cdot M)^2}{R_{ac}}$$
$$M = k \cdot \sqrt{L_{TX} \cdot L_{RX}}$$

ω(=2πf) is an angular frequency corresponding to a frequency f (that is, the switching frequency) of the AC power supplied to the transmission coil 12. In addition, k is a coupling degree between the transmission coil 12 and the reception coil 21. In addition, Ro is an equivalent load resistance connected with respect to the entire contactless power feed apparatus, that is, a load resistance observed from the side of the power transmission device 2 (simply referred to as the load resistance of the entire contactless power feed apparatus) during power transmission As can be shown from Equation (1), when the load resistance Rac of the power reception device 3 decreases, the load resistance Ro of the entire contactless power feed apparatus increases. On the contrary, when the load of the power reception device 3 creases and the load resistance Rac increases, the load resistance Ro of the entire contactless power feed apparatus decreases. Moreover, when the load resistance Ro becomes excessively small, ZVS is no longer achieved, or, compared with the timing at which the switching element 17 becomes ON, the timing at which the voltage applied to the switching element 17 becomes zero is too early. When the timing at which the voltage applied to the switching element 17 becomes zero is too early compared with the timing at which the switching element 17 becomes ON, a loss due to the current flowing in the body diode of the switching element 17 occurs. Thus, in the contactless power feed apparatus according to the comparative example, due to the change of the load of the load circuit 5 connected with the power reception device 3, the power transmission efficiency may deteriorate. Details in this regard may be referred to, for example, Chapter 2 of "Load-Independent Class-E Power Conversion", available at https://vtechworks.lib.vt.edu/handle/10919/97601 and published in 2020.

Figure 3:
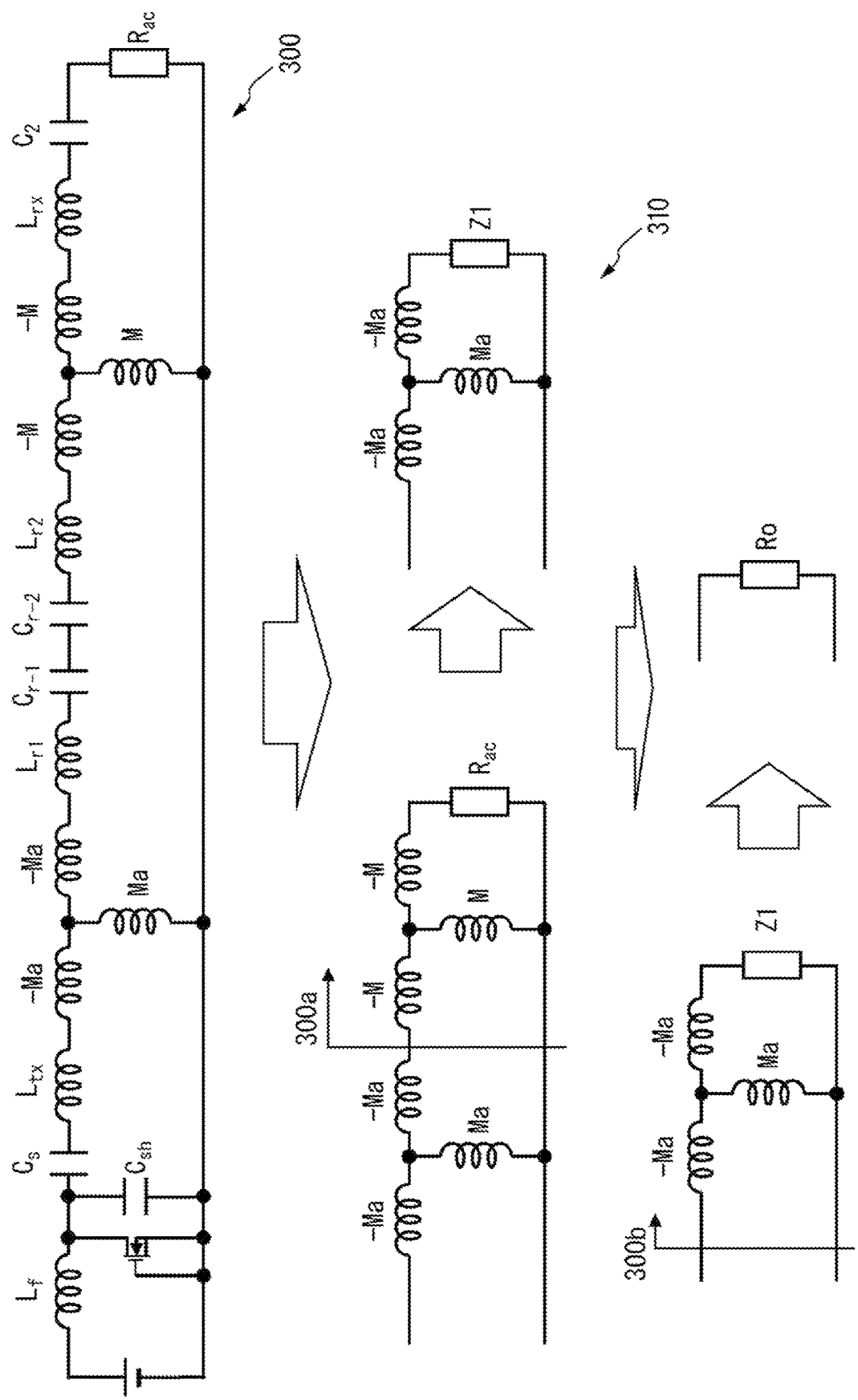
FIG. 3 is an equivalent circuit diagram of the contactless power feed apparatus according to the embodiment.

FIG. 3 is an equivalent circuit diagram of the contactless power feed apparatus 1 according to the embodiment. Here, in an equivalent circuit 300 thereof, like FIG. 2, Lf, Ltx, and Lrx are respectively the inductances of the coil 15 of the power supply circuit 11, the transmission coil 12, and the reception coil 21, and Csh, Cs, and C2 are respectively the capacitances of the capacitor 16 of the power supply circuit 11, the capacitor 13, and the resonant capacitor 22. In addition, Rac is a load resistance of the power reception device 3. In addition, Lr1, Lr2 are respectively the inductances of the first coil 31 and the second coil 32 of the relay circuit 4. In addition, Cr-1 and Cr-2 are obtained by dividing the capacitance of the resonant capacitor 33 of the relay circuit 4 into two (that is, the capacitance of the resonant capacitor 33 is: ((Cr-1)*(Cr-2))/((Cr-1)+(Cr-2))). In addition, Rac is a load resistance of the power reception device 3. In addition, Ma is the mutual inductance between the transmission coil 12 and the first coil 31, and M is the mutual inductance between the second coil 32 and the reception coil 21.

In the equivalent circuit 300, when the load resistance regarding the transmission device 2 and the relay circuit 4 is set as Z1, in the case where the resonant circuit 20 of the reception device 3 is resonating, a portion 300a closer to the power reception side than the second coil 32 in the equivalent circuit 300 is represented as an equivalent circuit 310. In this case, the load resistance Z1 is represented as follows.

[Equation 2]

$$Z1 = \frac{(\omega \cdot M)^2}{R_{ac}} \quad (2)$$
$$M = k\sqrt{L_{r2}L_{rx}}$$

Here, k is a coupling degree between the second coil 32 and the reception coil 21.

In addition, when the load resistance of the entire contactless power feed apparatus 1 is set as Ro, in the case where the relay circuit 4 is resonating, a portion 300b closer to the power reception side than the transmission coil 12 in the equivalent circuit 300 is represented by the load resistance Ro of the entire contactless power feed apparatus 1. In this case, the load resistance Ro is represented as follows.

[Equation 3]

$$R_o = \frac{(\omega \cdot Ma)^2}{Z1} = \frac{R_{ac} \cdot Ma^2}{M^2} \quad (3)$$
$$Ma = ka\sqrt{L_{tx}L_{r1}}$$

Here, ka is a coupling degree between the transmission coil 12 and the first coil 31.

As can be shown from Equation (3), differing from the comparative example, when the load of the power reception device 3 decreases and the load resistance Rac increases, the load resistance Ro of the entire contactless power feed apparatus increases. In addition, when the coupling degree k1 between the second coil 32 and the reception coil 21 decreases, the load resistance Ro of the entire contactless power feed apparatus increases. Therefore, when the load resistance Rac of the power reception device 3 becomes the expected minimum value and the coupling degree k1 between the second coil 32 and the reception coil 21 becomes the expected maximum value, the load resistance Ro of the entire contactless power feed apparatus becomes minimum. Therefore, the value of each circuit element of the contactless power feed apparatus 1 and the maximum coupling degree between the second coil 32 and the reception coil 21 are set, so that the load resistance Ro of the entire contactless power feed apparatus when the load resistance Rac of the power reception device 3 becomes the expected minimum value and the coupling degree k between the second coil 32 and the reception coil 21 becomes the expected maximum value achieves ZVS and becomes equal to or greater than the resistance value when the difference of the timing at which the voltage applied to the switching element 17 becomes zero with respect to the timing at which the switching element 17 becomes ON becomes equal to or less than the tolerated maximum value. Accordingly, even if the load of the power reception device 3 changes, ZVS is achieved, and the difference of the timing at which the voltage applied to the switching element 17 becomes zero with respect to the timing at which the switching element 17 becomes ON becomes equal to or less than the tolerated maximum value. In addition, even in the case where the power reception device 3 is away from the relay circuit 4 and cannot receive power anymore, since the coupling degree k between the second coil 32 and the reception coil 21 decreases, ZVS is achieved, and the difference of the timing at which the voltage applied to the switching element 17 becomes zero with respect to the timing at which the switching element 17 becomes ON becomes equal to or less than the tolerated maximum value. For the ease of description, in the following, the above conditions to be satisfied by the load resistance Ro are referred to as load resistance conditions.

For example, the inductance of the coil 15 of the power supply circuit 11 of the power transmission device 2 is 1 µH, and the transmission coil 12 of the power transmission device 2, the first coil 31 and the second coil 32 of the relay circuit 4, and the reception coil 21 of the power reception device 3 are each 3 µH. In addition, the capacitance of the capacitor 16 of the power supply circuit 11 of the power transmission device 2 is 330.4 pF, and the capacitance of the capacitor 13 is 201.9 pF. In addition, the capacitance of the resonant capacitor 33 of the relay circuit 4 is 91.8 pF, and the capacitance of the resonant capacitor 22 of the power reception device 3 is 184 pF. At this time, when the switching element 17 is driven at a switching frequency of 6.78 MHz and a duty ratio of 0.5, the load resistance Ro of the entire contactless power feed apparatus 1 at which ZVS is achieved and the difference of the timing at which the voltage applied to the switching element 17 becomes zero with respect to the timing at which the switching element 17 becomes ON becomes equal to or less than the tolerated maximum value becomes 41.4Ω (see the above reference document "Load-Independent Class-E Power Conversion"). Therefore, when it is assumed that the coupling degree between the transmission coil 12 and the first coil 31 is 0.5, and the expected maximum coupling degree between the second coil 32 and the reception coil 21 is 0.1, the minimum value Racmin of the load resistance of the power reception device 3 satisfying the load resistance conditions is 1.65Ω according to Equation (3). Therefore, it suffices as long as the contactless power feed apparatus 1 is configured so that, in the state in which the load circuit 5 is connected with the power reception device 3, the load resistance of the power reception device 3 is a value in which a predetermined offset is added to the minimum value Racmin, such as 2Ω.

For example, the longer the distance between the second coil 32 and the reception coil 21 of the power reception device 3, the smaller the coupling degree between the second coil 32 and the reception coil 21. Therefore, it suffices as long as the relay circuit 4 is disposed in the housing, so that, in the housing in which the relay circuit 4 is accommodated, the distance from the second coil 32 to the surface of the housing becomes a distance corresponding to the maximum coupling degree between the second coil 32 and the reception coil 21 of the power reception device 3 for satisfying the load resistance condition. Accordingly, the coupling degree between the second coil 32 and the reception coil 21 is constantly equal to or less than the maximum coupling degree. In addition, it suffices as long as, in the load circuit 5 or on a wiring where the power reception device 3 and the load circuit 5 are connected, a fixed load having a resistance value satisfying the load resistance conditions and corresponding to the minimum value of the load resistance of the power reception device 3.

In the following, the arrangements of the transmission coil 12 of the power transmission device 2 and the first coil 31 and the second coil 32 of the relay circuit 4 are described.

Figure 4:
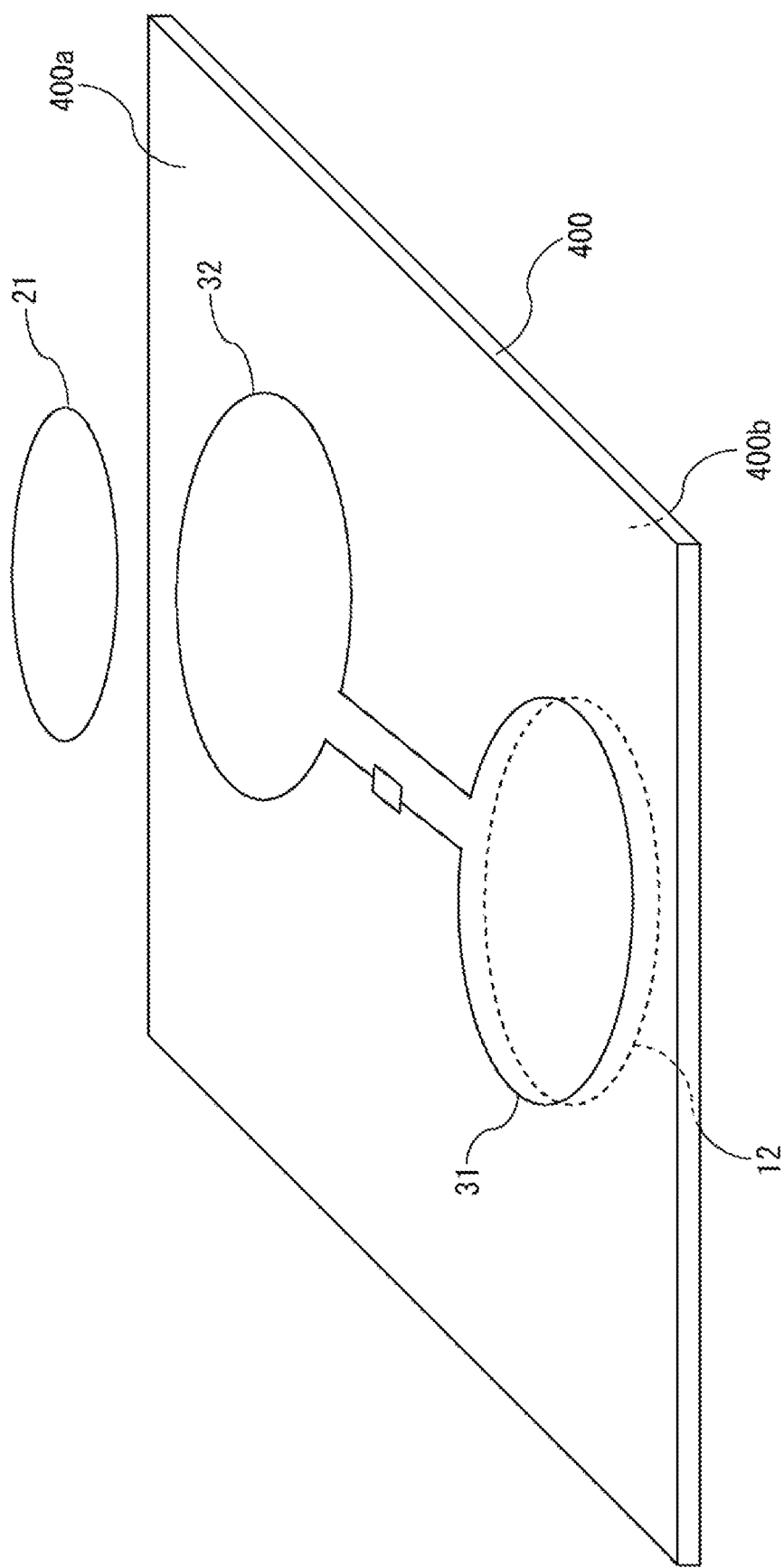
FIG. 4 is a view illustrating an example of the arrangements of a transmission coil, a first coil, and a second coil.

FIG. 4 is a view illustrating an example of the arrangements of the transmission coil 12, the first coil 31, and the second coil 32. In the example, the transmission coil 12, the first coil 31, and the second coil 32 are respectively formed by conductive patterns provided on a substrate 400. In FIG. 4, the illustration of circuit elements other than the transmission coil 12, the first coil 31, and the second coil 32 is omitted.

The transmission coil 12 and the first coil 31 may be arranged so that the coupling degree is as high as possible to increase the power transmission efficiency as much as possible. Therefore, in the example, the first coil 31 is formed on a surface 400a of the substrate 400, and the transmission coil 12 is formed on a surface 400b on a side opposite to the surface 400a, so that the central axis of the transmission coil 12 and the central axis of the first coil 31 are coaxial.

It may be that the second coil 32 and the reception coil 21 of the power reception device 3 electromagnetically coupled with the second coil 32 and receiving power via the second coil 32 are not electromagnetically coupled with the transmission coil 12 and the first coil 31. Therefore, the second coil 32 is disposed on the surface 400a of the substrate 400, like the first coil 31. In addition, when viewed in the normal direction of the surface 400a, the first coil 31 and the second coil 32 are not overlapped with each other, and are disposed to be separated by a predetermined distance or more. The predetermined distance is a distance in which the influences of the magnetic field generated by the transmission coil 12 and the magnetic field generated by the first coil 31 on the second coil 32 and the reception coil 21 performing reception from the second coil 32 can be ignored. Accordingly, the power reception of the reception coil 21 from the transmission coil 12 or the first coil 31 without via the second coil 32 is prevented. Therefore, even if the load of the power reception device 3 changes, the decrease of the load resistance of the entire contactless power feed apparatus 1 is suppressed.

Figure 5:
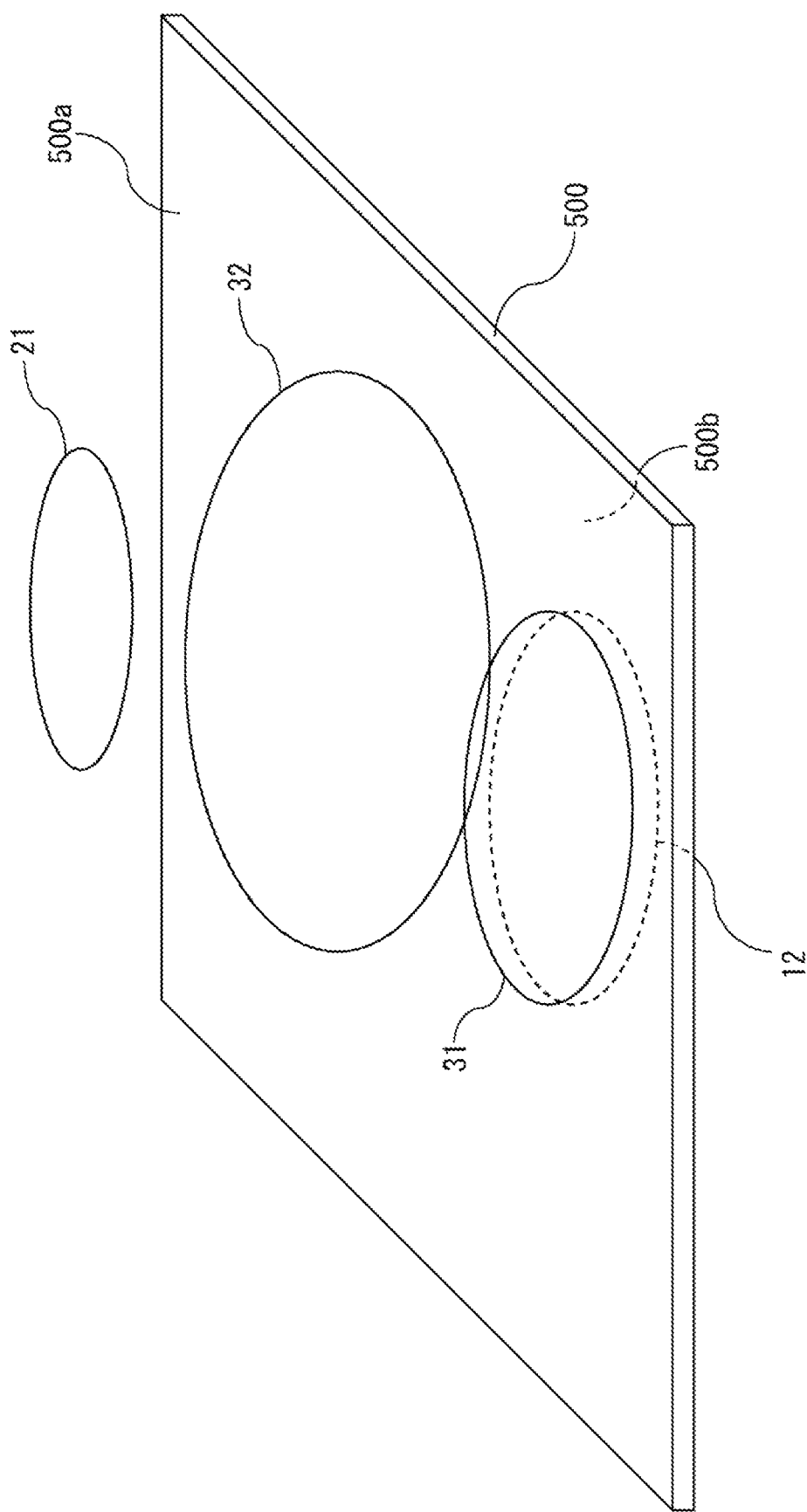
FIG. 5 is a view illustrating another example of the arrangements of the transmission coil, the first coil, and the second coil.

FIG. 5 is a view illustrating another example of the arrangements of the transmission coil 12, the first coil 31, and the second coil 32. In the example as well, the transmission coil 12, the first coil 31, and the second coil 32 are respectively formed by conductive patterns provided on a substrate 500. In FIG. 5, the illustration of circuit elements other than the transmission coil 12, the first coil 31, and the second coil 32 as well as the wirings connecting the respective coils of the relay circuit 4 is omitted.

In the example as well, the first coil 31 is formed on a surface 500a of the substrate 500, and the transmission coil 12 is formed on a surface 500b on a side opposite to the surface 500a, so that the central axis of the transmission coil 12 and the central axis of the first coil 31 are coaxial.

In addition, in this example as well, the second coil 32 may be disposed on the surface 500a of the substrate 500, like the first coil 31. However, in the example, when viewed in the normal direction of the surface 500a, the second coil 32 is disposed so that the first coil 31 and the transmission coil 12 are overlapped with the second coil 32 to an extent of not being electromagnetically coupled. That is, in the case where the first coil 31 and the second coil 32 are overlapped to the extent that the magnetic fields generated by the respective parts of the first coil 31 and passing through the interior of the second coil 32 cancel each other, the first coil 31 and the second coil 32 are not electromagnetically coupled. Similarly, in the case where the transmission coil 12 and the second coil 32 are overlapped to the extent that the magnetic fields generated by the respective parts of the transmission coil 12 and passing through the interior of the second coil 32 cancel each other, the transmission coil 12 and the second coil 32 are not electromagnetically coupled. For example, the inventors have confirmed through simulation that, in the case where the first coil 31 and the second coil 32 are both formed in a substantially square shape and in the same size, when one of the sides of the first coil 31 and one of the sides of the second coil 32 are located on the same line and the first coil 31 and the second coil 32 are overlapped by about 12%, the first coil 31 and the second coil 32 are not electromagnetically coupled. It is noted that a layer formed by an insulator may be provided between the first coil 31 and the second coil 32 in the portion where the first coil 31 and the second coil 32 are overlapped. In addition, in the example, at the time when the second coil 32 and the reception coil 21 are electromagnetically coupled and the reception coil 21 receives AC power from the second coil 32, it may be that it is easy to dispose the reception coil 21 so that the reception coil 21 is not electromagnetically coupled with the transmission coil 12 and the first coil 31. Therefore, the first coil 31 and the second coil 32 may be designed so that the outer periphery of the second coil 32 is greater than the outer periphery of the first coil 31.

It is noted that the shapes of the transmission coil 12, the first coil 31, and the second coil 32 are not limited to being circular. For example, the transmission coil 12, the first coil 31, and the second coil 32 may each be formed in a substantially square shape or formed in other polygonal shapes. In addition, the shape of the first coil 31 and the shape of the second coil 32 may be different from each other. In addition, the first coil 31 and the second coil 32 may also be disposed on different surfaces of a substrate. That is, in the example of FIG. 4 or FIG. 5, the second coil 32 may also be disposed on the surface of the substrate on the side where the transmission coil 12 is disposed. In this case, it suffices as long as the first coil 31 and the second coil 32 are connected through a via provided in the substrate. In addition, the arrangements of the transmission coil 12, the first coil 31, and the second coil 32 are not limited to the above. For example, the transmission coil 12 and the first coil 31 may also be wound around the same core formed by a magnetic body. In addition, the second coil 32 may also be wound around another core provided separately from the core around which the transmission coil 12 and the first coil 31 are wound. In addition, the cores around which the respective coils are wound may be cylindrical cores or doughnut-like cores. In addition, in the arrangement example shown in FIG. 4 as well, the first coil 31 and the second coil 32 may be designed so that the outer periphery of the second coil 32 is greater than the outer periphery of the first coil 31.

As described above, the contactless power feed apparatus drives a switching element of a power supply circuit supplying AC power to a coil on a power transmission side by using a switching frequency included in an ISM band with few usage limitations. In addition, the contactless power feed apparatus has a relay circuit for relaying the AC power transmitted from the device on the power transmission side to the device on the power reception side between the device on the power transmission side and the device on the power reception side. The relay circuit has a first coil electromagnetically coupled with a power transmission coil provided at the device on the power transmission side, a second coil electromagnetically coupled with a power reception coil provided at the device on the power reception side, and a resonant capacitor for resonating with respect to the AC power transmitted from the device on the power transmission side together with the first coil and the second coil. Accordingly, even if the load connected with the device on the power reception side changes, the contactless power feed apparatus can achieve ZVS and make the difference between the timing at which the switching element changes from OFF to ON and the timing of becoming the voltage applied to the switching element sufficiently small. Accordingly, the contactless power supply apparatus can alleviate the switching loss in the switching element to suppress the deterioration of the power transmission efficiency.

A person skilled in the art can make various modifications within the scope of the invention to suit the embodiment.

What is claimed is:

1. A contactless power feed apparatus, comprising:
   a power transmission device;
   a power reception device; and
   a relay circuit, relaying power transmitted from the power transmission device to the power reception device in a contactless manner,
   wherein the power transmission device comprises:
      a transmission coil, transmitting AC power that is supplied to the relay circuit; and
      a power supply circuit, converting DC power supplied from a DC power source into AC power having a predetermined frequency and supplying the AC power that is converted to the transmission coil,
   wherein the relay circuit comprises:
      a first coil, disposed to be electromagnetically coupled with the transmission coil and receiving the AC power from the transmission coil;
      a second coil, transmitting the AC power that is received via the first coil to the power reception device; and
      a resonant capacitor, resonating with the AC power supplied to the transmission coil together with the first coil and the second coil,
   wherein the power reception device comprises:
      a resonant circuit, having a reception coil receiving the AC power from the second coil by being electromagnetically coupled with the second coil of the relay circuit; and a rectifying and smoothing circuit, rectifying and converting the AC power output from the resonant circuit into DC power, and outputting the DC power to a load circuit, wherein the first coil of the relay circuit and the transmission coil of the power transmission device are wound on a same core.

2. The contactless power feed apparatus as claimed in claim 1, wherein the second coil of the relay circuit is disposed so as not to be electromagnetically coupled with the first coil of the relay circuit and the transmission coil of the power transmission device.

3. The contactless power feed apparatus as claimed in claim 2, wherein an outer periphery of the second coil is greater than an outer periphery of the first coil.

4. The contactless power feed apparatus as claimed in claim 1, wherein the first coil of the relay circuit is formed on a surface of a substrate and the transmission coil of the power transmission device is formed on an other surface of the substrate so that a central axis of the first coil and a central axis of the transmission coil are coaxial.

* * * * *